Nov. 7, 1967  R. T. HUKKI  3,351,195
METHOD AND APPARATUS FOR CONTINUOUS CLASSIFICATION OF
SOLID PARTICLES DISPERSED IN A FLUID CARRIER
Filed March 18, 1964  4 Sheets-Sheet 1

INVENTOR.
RISTO TAPANI HUKKI
BY *Mallinckrodt and Mallinckrodt*
ATTORNEYS

Nov. 7, 1967 R. T. HUKKI 3,351,195
METHOD AND APPARATUS FOR CONTINUOUS CLASSIFICATION OF
SOLID PARTICLES DISPERSED IN A FLUID CARRIER
Filed March 18, 1964 4 Sheets-Sheet 2

INVENTOR.
RISTO TAPANI HUKKI

ATTORNEYS

Nov. 7, 1967 R. T. HUKKI 3,351,195
METHOD AND APPARATUS FOR CONTINUOUS CLASSIFICATION OF
SOLID PARTICLES DISPERSED IN A FLUID CARRIER
Filed March 18, 1964 4 Sheets-Sheet 3

INVENTOR.
RISTO TAPANI HUKKI
BY
ATTORNEYS

FIG. 8.

INVENTOR.
RISTO TAPANI HUKKI

BY

ATTORNEYS

3,351,195
METHOD AND APPARATUS FOR CONTINUOUS CLASSIFICATION OF SOLID PARTICLES DISPERSED IN A FLUID CARRIER
Risto Tapani Hukki, Otakallio, Otaniemi, Finland
Filed Mar. 18, 1964, Ser. No. 352,771
Claims priority, application Great Britain, Apr. 8, 1963, 13,847/63
24 Claims. (Cl. 209—39)

This invention relates to the art of classifying and of separating classified fractions of solid particles dispersed in a fluid carrier, which particles differ in size, shape, specific gravity, or combinations of these, for example, particles of ore in a metallurgical pulp or gaseous suspension. It is particularly concerned with providing improved method and apparatus for the purpose.

There are many instances in industry where it is necessary or desirable that solid particles be graded in accordance with one or another of the aforementioned characteristics. Where size is the significant characteristic, screening is ordinarily the simplest procedure. However, many materials are made up of very fine particles or slimes which blind a screen and make it impossible to effectively obtain size separations by screening. In such instances and in those instances where shape and specific gravity are of importance, particle classification by differential settling in a fluid medium is practiced. Advantage is taken of differing resistances to fall, through the fluid medium, of the discrete solid particles concerned.

Classification is a well-developed art, replete with patents and other disclosures of actual and proposed apparatus purportedly capable of effecting desired results with maximum effectiveness. Nonetheless, it is a known fact among those concerned with the milling of ores and similar industrial procedures that much remains to be desired in the way of operating effectiveness, especially with respect to sharpness of separation.

Continuous hydraulic classification has been and is being performed in various ways:

(a) In open, so-called "cones," where the fines or partciles of less specific gravity are removed from a quiescent pool in a conical vessel by overflowing a circumferential weir at the top of the vessel and the coarse sands or particles of greater specific gravity are discharged through a valved opening at the downwardly directed apex of the cone. Apparatus of this type is usually considered obsolete.

(b) In mechanical classifiers, where the fines overflow a weir at one end of an elongate settling tank and the settled coarse sands are carried along an upwardly sloping approach to the opposite end of the tank by reciprocating rakes, slowly rotating spirals, or some other mechanical means and are discharged over a weir at that end of the tank. Although the possibilities of controlling the classification operation are crude and limited in apparatus of this type, such apparatus is in world-wide use.

(c) In so-called "hydrocyclones," where the pulp is introduced tangentially into a closed chamber from a pump or like source of pressure and is caused to rotate about the axis of the apparatus, with separation of fine and coarse size fractions taking place by centrifugal force in what may be regarded as concentric layers, the finer size fractions being discharged from selected layers by means of a movable discharge pipe or "vortex finder," while the coarse fraction is discharging through an opening at the cone apex. These hydrocyclones have gained wide acceptance, especially for the separation of particles in the finer size ranges, e.g. about 0.1 millimeter and below.

The performance of hydraulic classifiers has been generally unsatisfactory from the standpoint of sharpness of separation. The coarse fraction always carries a substantial amount of fines, which should report in the fine fraction. In many instances, the fine particles trapped and retained in the coarse fraction exceed the total amount of material reporting in the fine fraction. Thus, sharpness of separation in mechanical classifiers is only about 45–55% and in hydrocyclones only about 40–50%.

Continuous classification of gaseous suspensions is usually carried out in air cyclones, which resemble hydrocyclones in both construction and performance and suffer from essentially the same difficulties.

In the making of the present invention, it was a primary purpose to provide greatly improved results over presently known methods and apparatus. Thus, the obtaining of exceptionally clean or sharp separations between relatively fine and coarse and relatively light and heavy particles of an ore pulp or gaseous suspension of ground ore and of fluid suspensions of other finely divided solids was a principal objective.

Other objectives were to accomplish this with apparatus that would be capable of operating under gravity feed or low pressure feed, that would be simple in construction and compact in size, would require minimum power, and that would be subject to effective control in operation.

The enumerated objectives were and are accomplished, from the standpoint of method, by a unique combination of procedures. Thus, a continuously fed mass of discrete solid particles having various resistances to fall is rapidly rotated about a vertical axis to produce turbulent, spiraling, fluidized flow thereof and to effect movement, outwardly from the axis, of those particles having relatively slight resistance to fall and a resulting displacement, toward such axis, of those particles having relatively great resistance to fall, whereby the former particles tend to settle through the turbulent, fluidized mass and the latter particles tend to rise with the fluidized mass.

This procedure effects an initial separation between the two classes of particles, so that those particles having relatively slight resistance to fall, e.g. the coarse sands, can be discharged from the lower part of the fluidized mass as an underflow.

In combination with this initial separation and elimination of particles having relatively slight resistance to fall, is a braking or smoothing of the flow of the rising fluidized mass of particles having relatively great resistance to fall, e.g. the fines, to produce substantially laminar flow conditions characterized by a Reynolds number preferably less than 2100 but in any event below 3100 as determined by the pipe friction method, see pp. 99–101 of the textbook "Heat Transmission" by William H. McAdams, 1st edition, 1933, McGraw-Hill Book Company, Inc. This effects a separation of particles in such rising fluidized mass into two fractions, namely, particles having relatively great resistance to fall under the laminar flow conditions and middling particles having relatively slight resistance to fall under the laminar flow conditions.

As a final procedure in the method, the former of these fractions, e.g. made up of the fines in fluid suspension, is discharged as an overflow, while the latter, e.g. made up of the coarser, middling particles, is returned to the turbulent fluidized mass for discharge with the underflow.

Keeping particle size in the overflow substantially constant, despite changes from time to time in the rate of feed of material to be classified, is important in practice and is achieved in accordance with the invention.

The method is best accomplished by continuously feeding a fluidized mass of the discrete solid particles into a containing vessel which defines a particle-separation chamber functioning as an elutriation column and having a substantially conical lower section provided with a downwardly-directed apex, open for the discharge of material, and an upper section provided with an overflow weir or weirs for the discharge of material and with upwardly-directed, side-by-side, peripherally disposed, flow channels substantially closed laterally at all sides; by rapidly rotating the fluidized mass within the lower section of the chamber by the action of a rapidly rotating, neutral type of impeller, to move substantially horizontally outwardly from the axis of rotation, substantially without impeller-induced upflow, that fraction of the fluidized mass made up principally of particles which have relatively slight resistance to fall, to displace toward the axis that fraction made up principally of particles having relatively great resistance to fall, and to produce a resultant upwardly spiraling flow of the latter fraction by reason of the action of the impeller on the otherwise upward flow of material in the vessel; by diverting, within the upper section of the vessel and at multiple peripheral locations, the turbulent, upwardly spiraling flow, preferably by means of the aforementioned laterally closed, peripherally disposed, flow channels, to form relatively smooth, upwardly directed, mutually isolated, multiple flows characterized by a Reynolds number preferably less than 2100 but in any event less than 3100; by continuously discharging material from such multiple flows over the weir or weirs; and by continuously discharging, through the apex opening of the vessel, those particles having relatively slight resistance to fall. Varying impeller speed from time to time to compensate for variations in the rate of feed of material to be classified is an important aspect of the method.

From the standpoint of apparatus, the objectives were and are accomplished by providing means for carrying out the several steps of the method.

Thus, as previously indicated, the means for vigorously rotating the fluidized mass of solid particles is a neutral type of impeller, or several impellers depending upon the degree of turbulence desired, positioned within the conical lower section of the vessel and mechanically driven from any suitable source of power, such as an electric motor operating a variable speed drive arrangement.

The means for introducing the fluidized mass of particles into the separation chamber defined interiorly of the vessel is either a feed well extending downwardly through the top of the upper section of the vessel, centrally thereof, to a termination within or immediately above the conical lower section, or one or more conduits, such as pipes or hoses, extending toward and discharging in the vicinity of the impeller.

The means for diverting the turbulent, upwardly spiraling flow of the aforesaid fraction of the mass to smooth, multiple, mutually isolated flows directed upwardly preferably comprise closely spaced vanes radiating outwardly from the feed well and dividing the upper section of the vessel into a peripheral series of multiple channels substantially closed laterally at all sides and directed upwardly toward the rim of the vessel, which functions as an overflow weir. When these vanes are canted or inclined from the vertical, either toward or away from the direction of rotation of the pulp in the lower, turbulent zone and to a greater or lesser degree as occasion may warrant on the basis of the particular characteristics of the material being treated and on other factors whose significance will be apparent to those skilled in the art, the separating action is emphasized in the laminar flow zone with respect to the middling particles in the rising mass of those particles having relatively great resistance to fall.

The particular size or specific gravity at which parting, i.e. separation, occurs in the use of this invention is dependent principally upon the speed of rotation of the fluidized mass, the feed rate, the percentage of solids, viscosity of the fluid medium, particle sizes, shapes, and the specific gravities, the length of the elutriation column, and the rate of discharge of the underflow.

The introduction of streams of wash liquid or gas to the rotating fluidized mass of particles in the lower portion of the vessel is an optional but preferred part of the invention; the velocity, direction, and volume of these streams, when used, are factors in the particular size, shape, or specific gravity of particles obtainable in the overflow in any given instance.

Another optional feature is the provision of a magnetic belt about the vessel at a selected height, for the segregation and agglomeration of magnetic particles, so they will report in the underflow rather than in the overflow.

In all instances of the invention, whether considered from the standpoint of method or apparatus, spectacular new results in sharpness of separation are achieved. Contrary to conventional practice, the feed is introduced into a zone of turbulence, where a very effective initial or primary separation is achieved between particles having relatively slight resistance to fall and particles having relatively great resistance to fall. This effect is aided by scrubbing action between and attrition of individual particles, whereby adherent fines are liberated and subjected to separating action. This means that the apex discharge product is uncommonly free of entrapped particles having relatively great resistance to fall, and that such particles are in effect concentrated in the material flowing upwardly.

With the turbulent action created near the bottom of the cone and the feed introduced near the top of the cone centrally thereof, as is preferred, the feed first meets an inwardly disposed, upwardly spiraling, turbulent flow of less violence than near the bottom of the cone and separation of particles commences immediately. Those particles having relatively great resistance to fall tend to be carried upwardly by such spiraling flow, while those particles having relatively slight resistance to fall are thrown outwardly by centrifugal action and flow spirally downwardly outwardly of and countercurrent to the upwardly spiraling flow, as a fluidized mass which gradually increases in density, until, at the apex, it is so dense in many instances that it forms an effective seal against entry of atmospheric air during discharge.

The spiraling flow introduces a prolonged time factor by reason of the great length of the paths of travel of the particles, whereby efficient separation is achieved. Moreover, in passing through the zone of greatest turbulence, effective scrubbing and attrition and liberation of adherent fines take place, the liberated fines being crowded inwardly to join the upwardly spiraling flow.

The upward and downward countercurrent flows result from the continuous feed of material, with one fraction being taken as an underflow and another fraction as an overflow.

Middling particles, returned from the laminar flow zone as previously described, re-enter the turbulent zone outwardly of the upwardly spiraling flow and are carried downwardly by the downwardly spiraling flow.

There are shown in the accompanying drawings different embodiments of apparatus representing what are presently regarded as the best modes of carrying out the inventive concepts in commercial practice. From the detailed description of these specific forms of apparatus designed to carry out the method, other more specific objects and features of the invention will become apparent.

Figures 1, 2, 3:
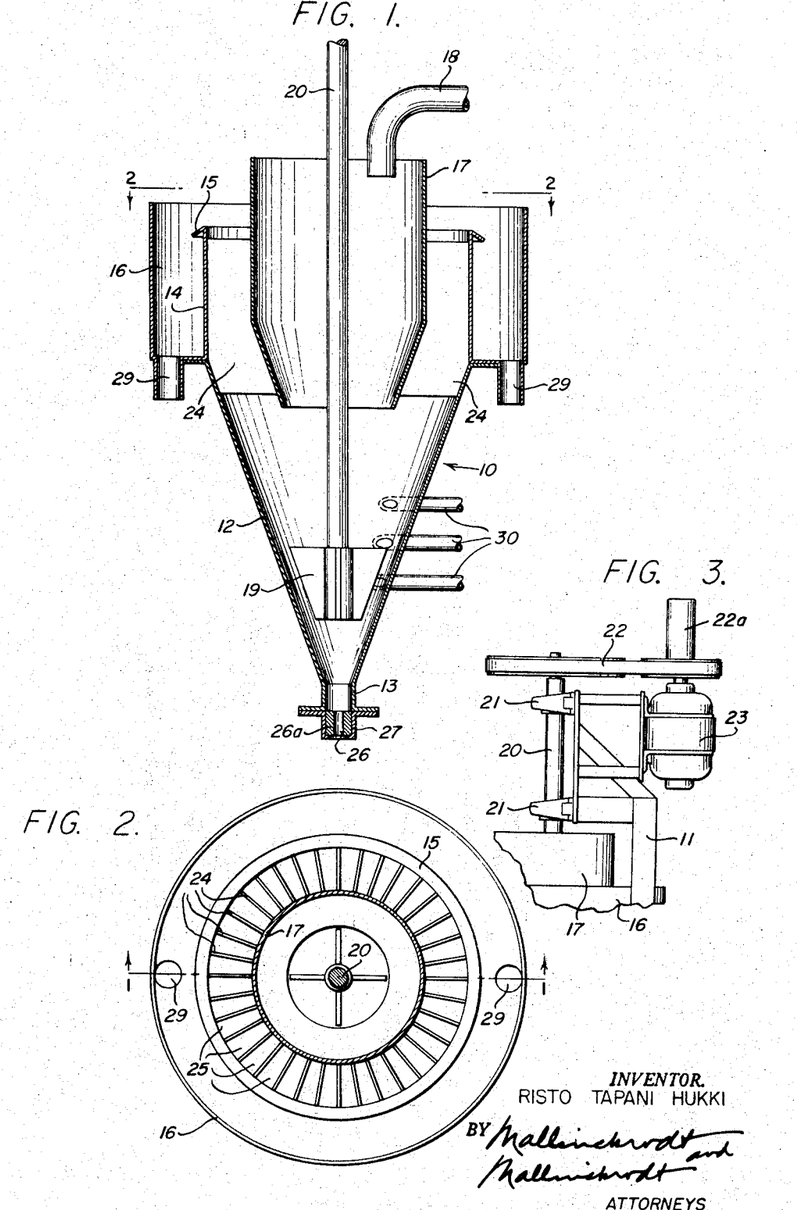
FIG. 1 represents an axial vertical section through a form of apparatus adapted to carry out the method on a mass of solid particles in a liquid fluidizing medium, the drive for the impeller being broken away and the section being taken on the line 1—1 in FIG. 2.
FIG. 2, a horizontal section taken on the line 2—2 of FIG. 1.
FIG. 3, a fragmentary elevation drawn to a considerably reduced scale showing a preferred drive arrangement for rotating the impeller.

Referring to the drawings:

The apparatus of FIGS. 1–3 comprises a stationary vessel 10 mounted on a supporting framework 11, FIG. 3, with its central axis vertical. Vessel 10 has a lower section 12 of conical formation with its apex 13 open and directed downwardly, and an upper section 14 with its top open and formed as a peripheral overflow lip or weir 15 leading into a surrounding launder 16. As illustrated, upper section 14 is primarily of cylindrical formation, but it may be otherwise, e.g. polygonal, conical, etc. Moreover, the conical lower section need not be conical throughout its entire height, but may have its upper portion cylindrical or polygonal to a greater or less extent, depending upon the desired total length of the separation chamber or elutriation column defined by the vessel 10.

A feed well 17 extends downwardly through the upper section 14 of the vessel, from above the weir 15 into the lower section 12 concentrically with the axis of the vessel, to continuously feed a pulp, slurry, or other liquid suspension of solid particles from a feed pipe 18 to such lower section, where it is rapidly rotated about the axis by means of a neutral type of impeller 19. The impeller is mounted at the lower end of a shaft 20, which is journaled in bearings 21, FIG. 3, and is rotated by a belt and pulley drive 22 powered by an electric motor 23 through a variable drive 22a. As previously indicated, a "neutral" type of impeller is an impeller that throws material outwardly of the axis of rotation along substantially horizontal lines and substantially without inducing upflow of material.

In the annular space between feed well 17 and the peripheral walls of upper section 14 of the vessel is a plurality of radial vanes 24, preferably closely spaced as shown in FIG. 2 to provide a peripheral, here circumferential, series of flow channels 25. It is convenient to secure these vanes to the feed well, as by welding, and to leave them unattached to the walls of vessel 10, so feed well and vanes form a unitized assembly which may be conveniently inserted in the vessel and adjusted to a desired vertical position therein by appropriate means.

With the vessel 10 filled by a liquid suspension of solid particles having various resistances to fall through the liquid medium by reason of differences in size, shape, or specific gravity, or combinations of these, and with impeller 19 rapidly rotating as more of the liquid suspension is continuously fed into lower section 12 of the vessel through feed well 17, the liquid suspension, i.e. fluidized mass, of particles in such lower section is vigorously rotated to produce turbulent, spiraling flow, which moves those particles having relatively slight resistance to fall, outwardly from the axis of rotation and displaces those having relatively great resistance to fall, toward the axis, and causes the latter to rise in the vessel. The former particles settle into apex 13 and pass out of the vessel through discharge passage 26 of a removable valve fitting 27, whose tubular insert 28 may be selected of appropriate underflow discharge capacity for any given operation. If desired, an adjustable valve can be used instead of the replaceable insert 26a.

The turbulent rising flow of the mass of fluidized particles having relatively great resistance to fall is diverted toward the sides of the vessel and away from the outlet orifice of feed well 17 by reason of the greater specific gravity of the feed entering lower section 12 of the vessel. As it swirls upwardly into upper section 14 of the vessel, its flow is intercepted and diverted by the vanes 24 at the multiple locations thereof to form relatively smooth, upwardly directed, multiple flows through the channels 25, such flows being laminar and characterized by a Reynolds number as previously indicated. Material from these flows discharge over the peripheral lip or weir 15 into launder 16, from where it discharges through outlets 29 as a desired fraction of the feed material.

As previously indicated, this overflow fraction is predetermined in character principally by the speed of rotation impeller 19, the rate of material feed through supply pipe 18, the percent solids in the feed material, the viscosity of the fluid medium, particle sizes, shapes, and specific gravities, the length of the elutriation column defined within vessel 10 from apex to overflow, and the size of the underflow discharge passage 26. These factors are normally predetermined before the operation is commenced, but the variable speed drive 22a for the impeller and an adjustable valve (not shown) at the apex discharge for the underflow, enable adjustments to be made during the course of operation to accord with any changes that may take place in the rate or character of the feed.

Sharpnesses of separation above 90% have been consistently achieved on metallurgical feed materials normally handled by hydrocyclones with sharpnesses of separation only about 50%.

It should be understood that the feed well 17, as such, is not necessary if the feed or supply pipe 18 is extended down through the interior of vessel 10 to a discharge immediately above the impeller. Under such circumstances, the diameter of the feed well will be reduced to an extent where it is just slightly greater than that of shaft 20 and the lengths of the vanes 24 will be extended accordingly.

It has been found advantageous to inject streams of whatever liquid medium is involved in the suspension being operated on, into the turbulent zone within the conical lower section of the vessel as an aid to particle separation. For this purpose, there are provided inflow pipes 30, FIG. 1, leading from a pressurized source of such liquid medium. These pipes may be directed tangentially or at any degree between that and normal to the turbulent spiraling flow, in order to add to the turbulence in any desired degree.

Figure 4:
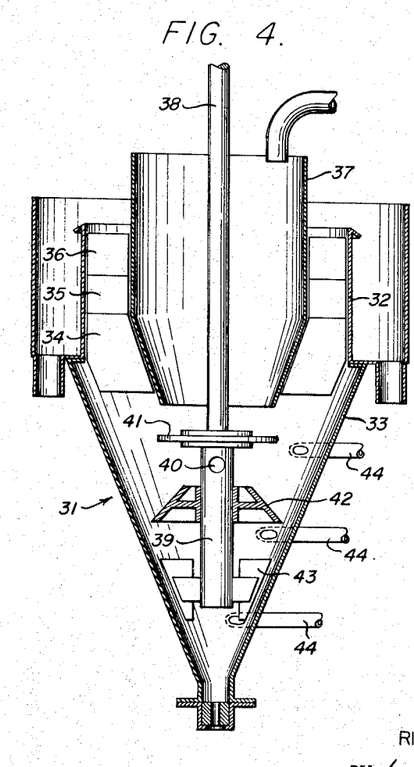
FIG. 4, a view similar to that of FIG. 1, but illustrating a somewhat different form of apparatus.
Figure 5:
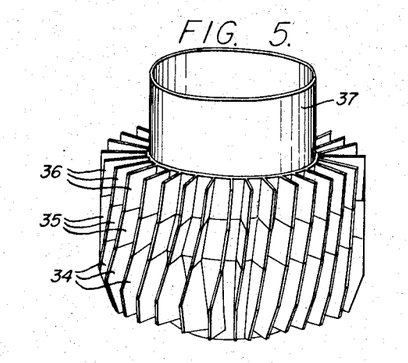
FIG. 5, a perspective view of the assembly of vanes of FIG. 4, per se.

In the form of apparatus shown in FIGS. 4 and 5, the vessel 31 is somewhat differently configurated than in FIG. 1, the cylindrical portion 32 being less in diameter than the top of the conical portion 33. This is desirable where the volume of coarse fraction in a material being treated is abnormally large.

The vanes are shown as being arranged in bands, with the vanes in the several bands differing somewhat in inclination from band to band. Thus, vanes 34 of a lower band are inclined at one angle, see FIG. 5, vanes 35 of an intermediate band at a somewhat different angle, and vanes 36 of an upper band at still another angle. The several bands encircle and are attached to feed well 37.

It should be noted that this arrangement of vanes can be advantageously employed with the embodiment of FIGS. 1–3 and other forms of the apparatus, and that the angles of inclination of the vanes of the several belts can be altered within wide limits for particular applications of the invention, so long as the flows through the multiple channels defined thereby remain substantially laminar, as previously indicated.

The impeller shaft 38 is different in this embodiment, in that its lower portion 39 is enlarged in diameter and tubular, with its lower end open for entry of material and with one or more upper openings 40 for vigorous discharge of such material. Fixed to shaft 38 immediately above discharge openings 40 is a throw disc 41 and below such openings a pumping type of impeller 42. Fixed to the lower end of shaft 38 is a side-throw, i.e. neutral type, impeller 43 corresponding in essence to the impeller 19.

This form of apparatus is intended for use where the coarse settling fraction must be extremely well cleaned of fine material. Material entering cone 33 is first spread outwardly by rotating disc 41 and descends as a rotating curtain. Streams of wash liquid admitted through pipes 44 must flow through this curtain of particles. Fines are effectively carried upwardly with the ascending flow, but the coarse fraction is repeatedly washed. Wash liquid from middle pipe 44 is carried upwardly by impeller 42 along with other material. Wash liquid from lowermost pipe 44 and other material ascend through tubular lower section 39 of the impeller shaft and are forcibly expelled through openings 40. Repeated opening and washing of the bed of settling particles by jets and the resulting rearrangement of particles result in particularly effective removal of fine particles from such bed.

Figure 6:
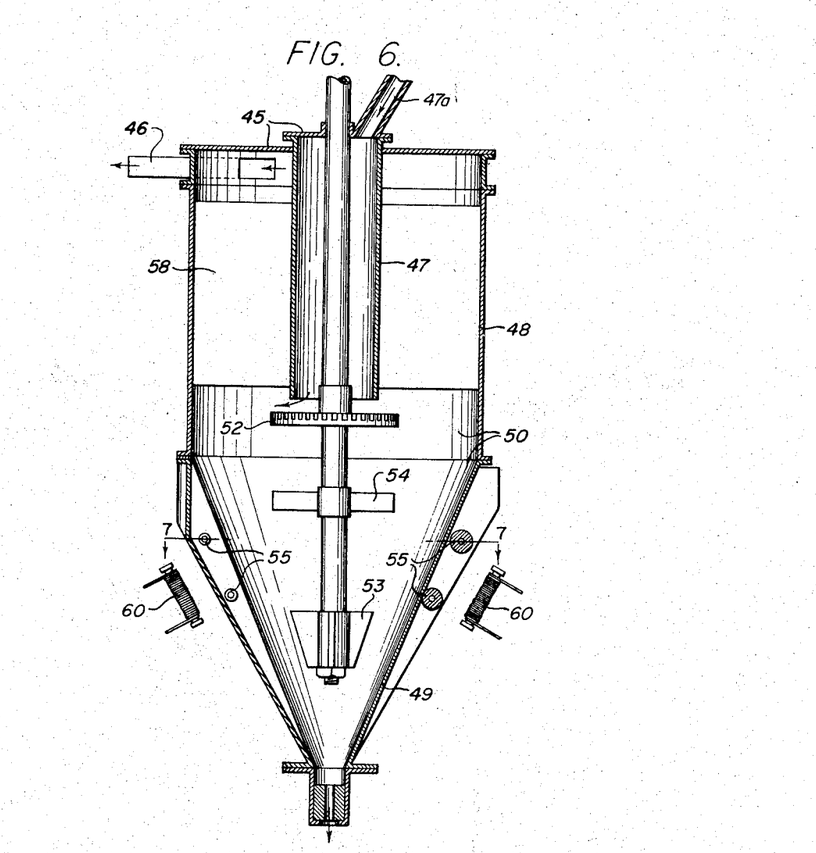
FIG. 6, a view corresponding to those of FIGS. 1 and 4, but showing a somewhat different form of apparatus adapted to carry out the method on a mass of solid particles fluidized by a gaseous medium and equipped with a magnetic belt, the section being taken on the line 6—6 of FIG. 7.
Figure 7:
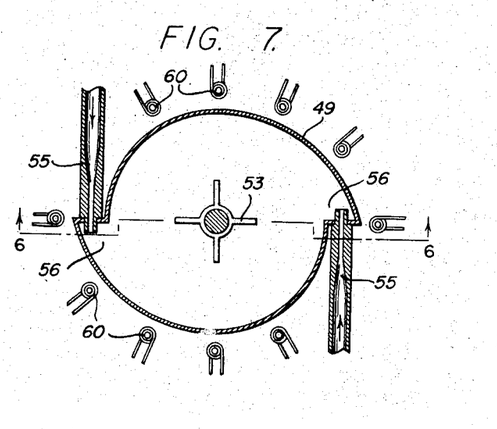
FIG. 7, a horizontal section taken on the line 7—7 of FIG. 6.

In the apparatus of FIGS. 6 and 7, designed for the handling of gaseous suspensions of solid particles, the only difference of fundamental importance over the above forms of apparatus is the provision of a closed top 45 for the vessel and the replacement of the overflow launder with an outflow conduit 46.

In the form illustrated, feed well 47 terminates in a cylindrical section 48 of the vessel above conical section 49 thereof, to define a turbulent section or zone 50 of the separation chamber extending upwardly beyond the cone. The impeller shaft 51 carries an upwardly vaned disc 52 in the upper portion of the turbulent zone to receive and spread dry discrete solid particles as they emerge from the bottom of feed well 47, having been introduced through feed pipe 47a.

Such particles tend to fall as a rotating curtain into the lower part of turbulent zone 50, where they are subjected to the action of neutral type impeller 53 and caused to rotate vigorously as a fluidized mass. An upper impeller 54 aids impeller 53 in maintaining the fluidized character and turbulence of the mass of particles.

Cleaning air or other gas is introduced under pressure through nozzles 55 into diametrically opposite entryways 56 of conical section 49, and must pass through the curtain of descending particles. Those particles having relatively slight resistance to fall are thrown outwardly and tend to hug the walls of the vessel as they settle through the fluidized mass and pass from the vessel through apex opening 57. Those having relatively great resistance to fall move upwardly in substantially laminar flow through the series of channels defined by multiple vanes 58 in the upper portion of cylindrical section 48 of the vessel and are finally discharged through conduit 46.

It should be noted that the volume of the spiraling, fluidized bed of settling solids is changed at the entryways 56, so the inflowing gas can function with maximum effectiveness in cleaning such bed of trapped particles having relatively great resistance to fall.

The entryway construction of the embodiment can be used with similar effect in connection with pipes 30 and pipes 44 of the foregoing hydraulic embodiments, and all embodiments can have the feed introduced either by gravity or under pressure.

The solid particles and fluid medium could conceivably be separately fed into the receiving vessel for fluidizing by turbulent action therewithin.

In treating finely ground magnetite pulps or other materials containing strongly or weakly magnetic particles, a magnetic belt, such as shown at 60, FIG. 6, can be added to the vessel to segregate the magnetic material and allow non-magnetic fines, e.g. silicate slimes, to escape into the fine fraction. The magnetite particles will tend to agglomerate and report in the underflow. As illustrated, the magnetic belt may be made up of a series of electromagnets with the magnetic force being adjustable in any well-known manner. It could, however, be provided by permanent magnets positioned to exert any desired degree of magnetic force on the material within the vessel.

It should be noted that the upper portion of the upwardly directed laminar flow in all embodiments of the invention is of substantially uniform density throughout a section of the total height of the separation chamber or elutriation column whose extent in any given instance depends upon the particular feed material and design factors involved.

Figure 8:
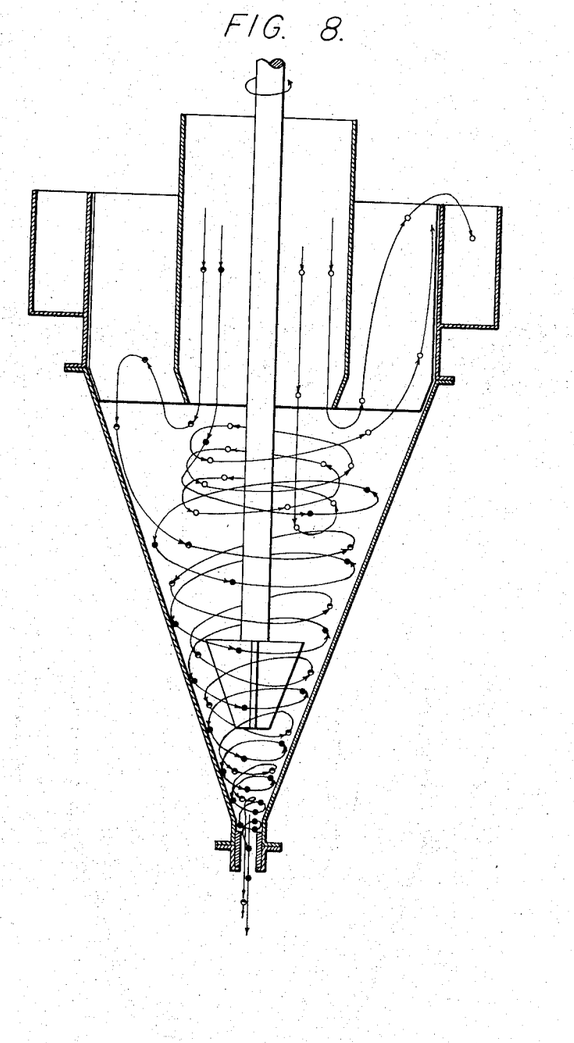
FIG. 8, a schematic, axial, vertical section in which flow patterns are delineated.

Travel of material within the separation chamber or elutriation column of the basic apparatus of the invention occurs substantially as indicated by the flow patterns applied to the schematic representation of FIG. 8. These flow patterns are as described hereinbefore. A typical path of a particle having relatively slight resistance to fall is marked by solid dots; a typical path of one having relatively great resistance to fall is marked by small circles; a typical path of a middling particle is shown by a symbol which is half solid dot and half small circle.

The smooth or substantially laminar character of the flow in the upper section of the vessel in all embodiments of the invention, as contrasted with the turbluent flow conditions in the lower section, is highly significant. In the engineering design of apparatus conforming to the invention, the following formula is basic:

$$\text{Re (Reynolds number)} = \frac{DVp}{u} < 2000 \quad (1)$$

In this equation, applicable to the flow of fluid in circular pipes:

$D=$ internal diameter of the pipe in cms.
$V=$ mean velocity of the stream past a given cross section in centimeters per second
$p=$ density of the suspension in grams/cubic centimeter
$u=$ viscosity of the suspension in gms./cm./sec.

If Equation 1 is expressed in terms of the hydraulic radius $R_h$ for pipes having the indicated internal diameter $D$, then $$R_h = \frac{\text{cross sectional area}}{\text{wetted perimeter}} = \frac{D}{4}$$

and $$\text{Re} = \frac{4R_h V p}{u} < 2000 \quad (2)$$

Equation 2 can be applied for non-circular channels, such as the flow channels between vanes in the braking means of apparatus constructed in accordance with this invention. As a first approximation, the hydraulic radius for flow channels of this type can be taken as ½ of the free clearance. For apparatus of large industrial size, $R_h$ may be taken as 2 cm.

The limiting velocity for laminar flow is obtained by solving Equation 2 for $V$.

$$V = \frac{2000u}{4R_h p} \quad (3)$$

For hydraulic classification of a mineral pulp in a flotation plant the following values apply:

$u = 0.03$ gm./cm./sec.
$p = 1.5$ gms./cu. cm.
$R_h = 2$ cm.

Under these conditions, $V < 5$ cm./second
$V < 3$ meters/minute
$V < 180$ meters/hour The maximum laminar flow capacity based on Re=2000 of a hydraulic classifier representing a total cross-sectional area of only one square meter should be 180 cubic meters of overflowing pulp per hour, or 270 tons of pulp per hour, under the conditions analyzed here.

In this connection, it is of particular interest to note that the settling velocity of 48 mesh (0.3 mm.) particles of common sulfide minerals under the equivalent conditions is of the order of 5 cm./second. Hence, the apparatus described in this invention is seen to be of ideal construction for industrial wet classification of mineral materials, for example. Very great capacities can be anticipated.

Equation 3 can also be applied for classification of gaseous suspensions. For clean air:

$u = 1.7 \times 10^{-4}$ gms./cm./sec.,
$p = 1.2 \times 10^{-3}$ gms./cu. cm.

If $R_h = 2$ cm., $V < 35$ cm./second,
$V < 21$ m./minute,
$V < 1260$ m./hour.

For air suspensions carrying fine mineral material, limiting velocities V are even higher than those shown above for clean air.

For a comparison it may be mentioned that the settling velocity of 150 mesh (0.1 mm.) particles of quartz in air is about 30 cm./second (Taggart, page 9–02, FIG. 1). This shows that the pneumatic classifier described here is well adapted for dry separations, especially in sizes less than 0.1 mm. In industry, this is a most important size range, e.g. the classification of ground cement.

This analysis shows further that the hydraulic radius $R_h$ is an important variable in the construction and operation of the apparatus. From a practical point of view, its most convenient range is from 1 cm. to 5 cm. for units up to 1 m. in diameter.

In apparatus where the laminar upward flow is vertical, the velocity V of the stream determines the maximum particle size in the overflow product under a given set of conditions. If the laminar flow is inclined, the maximum particle size corresponding to velocity V decreases with decreasing slope with respect to the horizontal, decreasing hydraulic radius, and increasing vertical distance between inlet and outlet levels in the upper, laminar flow zone.

The utility of this invention can be seen from the following experimental data:

Example I

Tests were conducted with equipment which included a large tank for pulp, a 3″ centrifugal pump, a test classifier constructed in accordance with FIGS. 1–3, and the necessary piping. This equipment was operated in closed circuit in such a way that the classified products were returned to the storage tank. The diameter of the cylindrical top section of the classifier was 50 cm., the cone angle 40°, and the impeller speed 280 r.p.m. Feed material consisted of heavy sulfide ore ground in a rod mill. Feed rates varied from 2–26 tons/hour of dry solids, and overflow rates for the fine fraction from 50–90% of the feed rate. Pulp densities varied between 50 and 60% solids for the feed, between 45 and 55% for the fine fraction, and between 75 and 85% for the coarse fraction. The following results were obtained in the middle capacity range without any wash water:

| Screen | | Feed, Percent through | Fine Product, Percent through | Coarse Product, Percent through | Sharpness of Separation, Percent |
|---|---|---|---|---|---|
| Mesh | Microns | | | | |
| 35 | 417 | 96.8 | 98.7 | 88.9 | 82.6 |
| 48 | 295 | 89.2 | 93.0 | 74.7 | 84.5 |
| 65 | 208 | 74.9 | 80.7 | 50.1 | 87.3 |
| 100 | 147 | 54.2 | 60.5 | 27.5 | 90.3 |
| 150 | 104 | 36.9 | 42.2 | 14.0 | 92.9 |
| 200 | 74 | 24.7 | 28.7 | 7.5 | 94.3 |
| Dry tons/hour | | 9.92 | 8.04 | 1.88 | |
| Percent solids | | 54 | 50 | 85 | |

The highest figure so far obtained for the sharpness of separation with this feed material at 0.208 mm. (about 65 mesh) has been about 93%.

The term "sharpness of separation" means the percentage ratio of material finer than a given size which reports in the overflow product, compared to the total amount of material finer than this given size available in the feed.

In order to appreciate the quality of the figures presented above they should be compared with results obtained in a conventional rake-type classifier, 2.4 m. x 9 m. (8′ x 30′ approximately) in size, treating the same type of ore:

| Screen | | Feed, Percent through | Fine Product, Percent through | Coarse Product, Percent through | Sharpness of Separation, Percent |
|---|---|---|---|---|---|
| Mesh | Microns | | | | |
| 35 | 417 | 92.2 | 99.0 | 88.0 | 40.2 |
| 48 | 295 | 83.6 | 97.3 | 75.4 | 43.6 |
| 65 | 208 | 73.3 | 95.6 | 59.9 | 48.8 |
| 100 | 147 | 52.6 | 85.7 | 32.8 | 60.9 |
| 150 | 104 | 45.4 | 81.4 | 23.8 | 67.2 |
| 200 | 74 | 29.5 | 63.5 | 9.1 | 80.7 |
| Dry tons/hour | | 93.9 | 35.1 | 58.8 | |
| Percent solids | | 45.6 | 26.4 | 80.5 | |

A hydrocyclone in place of the rake classifier gave results somewhat lower in sharpness of separation.

In this comparison, the capacity of the small diameter 50 cm. test unit to produce finished material (8.04 dry tons/hour) is about 23% of that of the very large (2.4 x 9 m.) industrial unit.

Example II

In corresponding apparatus, but without the introduction of wash water and using 2.6 specific gravity silica sand as the solid material in the feed, results were as follows:

| Screen | | Feed, Percent through | Fine Product, Percent through | Coarse Product, Percent through | Sharpness of Separation, Percent |
|---|---|---|---|---|---|
| Mesh | Microns | | | | |
| 35 | 420 | 74.4 | 99.5 | 11.1 | 90.2 |
| 48 | 297 | 67.0 | 94.0 | 7.4 | 94.5 |
| 65 | 210 | 60.6 | 86.3 | 5.5 | 95.9 |
| 100 | 149 | 54.1 | 77.6 | 4.6 | 96.7 |
| 150 | 105 | 48.8 | 70.2 | 4.0 | 98.1 |
| 200 | 74 | 43.7 | 63.0 | 3.9 | 98.2 |
| Dry tons/hour | | 6.36 | 4.29 | 2.07 | |
| Percent solids | | 24.2 | 18.2 | 74.5 | |

Example III

| Screen | | Feed, Percent through | Fine Product, Percent through | Coarse Product, Percent through | Sharpness of Separation, Percent |
|---|---|---|---|---|---|
| Mesh | Microns | | | | |
| 16 | 1,000 | 95.8 | 99.0 | 50.6 | 83.3 |
| 35 | 420 | 71.3 | 82.8 | 14.2 | 93.6 |
| 100 | 149 | 51.8 | 62.3 | 6.4 | 97.0 |
| 200 | 74 | 43.9 | 53.0 | 5.4 | 97.3 |
| Dry tons/hour | | 8.62 | 6.95 | 1.67 | |
| Percent solids | | 30 | 26.2 | 76.0 | |

Example IV

| Screen | | Feed, Percent through | Fine Product, Percent through | Coarse Product, Percent through | Sharpness of Separation, Percent |
|---|---|---|---|---|---|
| Mesh | Microns | | | | |
| 48 | 297 | 67.2 | 99.3 | 17.6 | 90.4 |
| 65 | 210 | 62.1 | 97.0 | 8.2 | 95.5 |
| 100 | 149 | 55.3 | 88.3 | 4.3 | 97.7 |
| 150 | 105 | 47.9 | 77.1 | 2.7 | 98.4 |
| 200 | 74 | 39.9 | 64.6 | 1.7 | 99.0 |
| Dry tons/hour | | 2.24 | 1.37 | 0.87 | |
| Percent solids | | 19.5 | 13.3 | 71.1 | |

Whereas there are here illustrated and described procedures and apparatus which are presently regarded as the best modes of carrying out the invention, it should be understood that various changes can be made without departing from the inventive concepts particularly pointed out and claimed herebelow.

I claim:

1. A method of continuously classifying discrete solid particles having various resistances to fall through a fluid medium, comprising the steps of rapidly rotating a mass of said particles and a fluid medium about a vertical axis in a containing vessel by means of a neutral type of impeller operating in a zone of turbulence of said vessel defined by upwardly and outwardly divergent walls, so as to force said mass substantially horizontally outwardly from said axis toward said walls without substantial upflow;

continuously feeding additional particles and fluid medium directly to said zone of turbulence and adjacent to said vertical axis, so as to produce, together with the action of said impeller, a turbulent, spiraling fluidized flow of material, wherein those particles having relatively slight resistance to fall are moved outwardly from said axis and those particles having relatively great resistance to fall are displaced toward said axis;

continuously discharging at said axis and from below said mass, as an underflow product, a fraction of said mass equivalent to part of the feed;

continuously discharging from above and peripherally of said mass, as an overflow product, a fraction of said mass substantially equivalent to the remainder of the feed;

whereby those particles having relatively great resistance to fall tend to ascend along an inwardly disposed, turbulent, spiraling flow and those particles having relatively slight resistance to fall tend to descend to discharge along an outwardly disposed, turbulent, spiraling flow;

smoothing the rising turbulent flow in an upwardly disposed zone by diverting it into upwardly directed, peripherally arranged, flow channels that are substantially closed laterally at all sides to produce a plurality of mutually isolated, upward, substantially laminar flows to discharge, whereby said particles having relatively great resistance to fall are separated into two fractions principally comprising, respectively, particles having relatively great resistance to fall under conditions of said laminar flows and particles having relatively slight resistance to fall under conditions of said laminar flows;

controlling the speed of rotation of said impeller in accordance with changes in the rate and character of the feed;

and returning to the turbulent fluidized mass, for discharge with the underflow product, that fraction principally comprising said particles having relatively slight resistance to fall under said conditions of laminar flows.

2. The method of claim 1, wherein the mass of particles are continuously fed to the turbulent, fluidized mass as a rotating curtain substantially concentric with the axis, and a least one stream of a fluid wash medium is continuously directed through said curtain as it rotates.

3. The method of claim 1, wherein the upward laminar flows are inclined to the vertical.

4. The method of claim 3, wherein the incline to the vertical is made up of successively different degrees of slope along the height of the respective upward laminar flows.

5. The method of claim 1, wherein the upper portion of the laminar flowing material immediately in advance of discharge of the overflow product is maintained at substantially uniform density.

6. The method of claim 1, wherein, as an additional step, at least one band of magnetism is applied about the fluidized mass to segregate and agglomerate magnetic particles therein.

7. The method of claim 1, including the additional step of continuously introducing a wash medium into the rotating fluidized mass within the lower section of the vessel to liberate those particles having greater resistance to fall, from entrapment by those particles having lesser resistance to fall.

8. The method of claim 7, wherein the volume of the rotating fluidized mass is expanded at the location of introduction of the wash medium.

9. The method of claim 1, wherein the particles and fluid medium are fed near the top of the zone of turbulence.

10. A method for continues classification of solids in a fluid medium, comprising a two step process carried out in one and the same apparatus, the primary phase of the process being characterized by feeding diverse solid particles and a fluidizing medium directly into a zone of turbulence, by separation of the feed material into two fractions under turbulent flow conditions about a vertical axis within said turbulent zone, one of which settles, and by discharge of the settled fraction from said turbulent zone as the final underflow product, and the secondary phase of the process being characterized by reclassification of the other fraction of the said two on a higher elevation into two new fractions, one made up principally of suspended particles and the other made up principally of middling particles that tend to settle, these new fractions being in the same medium but under controlled, upwardly directed, substantially laminar flow conditions, the suspended fraction, only, being discharged as the final overflow product, while the middling fraction consisting of particles gone astray settles by gravity back to the lower turbulent primary phase and to discharge with the underflow product, said reclassification being carried out in multiple flows of fluidized solids arranged peripherally of said apparatus and inclined sufficiently to effect a praticle-separating action, said flows being confined laterally at all sides so as to be isolated from one another.

11. The method of claim 10, wherein the particles and fluid medium are fed near the top of the zone of turbulence.

12. Apparatus for the continuous classification of discrete solid particles having various resistances to fall through a fluid medium, comprising a containing vessel having walls which define about a vertical axis a particle-separation chamber having a lower portion establishing a zone of turbulence and an upper portion adapted to effect laminar flow, said lower portion being of substantially conical form with a downwardly directed apex open for the discharge of material, and said upper portion being provided with peripheral overflow means for the discharge of material;

a neutral type of impeller mounted within said lower portion of the vessel for rotation about said vertical axis, so as to force said particles and said fluid medium substantially horizontally outwardly from said axis toward the walls of the vessel;

variable speed means for rotating said impeller;

means for continuously feeding additional particles and fluid medium directly to said zone of turbulence and adjacent to said vertical axis, so as to produce, together with the action of said impeller, a turbulent, spiraling, fluidized flow of material, wherein those particles having relatively slight resistance to fall are moved outwardly from said axis and those particles having relatively great resistance to fall are displaced toward said axis;

and a plurality of upwardly-directed conduit means in and arranged peripherally of the said upper portion of the vessel, said conduit means being respectively closed laterally at all sides to form mutually isolated flow channels for smoothing the turbulent flow of said mass to laminar flow as it rises toward said overflow means by reason of the continued introduction of material into said chamber.

13. The apparatus of claim 12, wherein the conduit means comprise multiple, upwardly-extending vanes disposed within the upper portion of the vessel transversely of the path of the rising turbulent flow, to divert said flow to substantially laminar multiple flows directed upwardly for discharge by way of the overflow means of the vessel.

14. The apparatus of claim 13, wherein the vanes are radially disposed with respect to the axis of rotation of the fluidized mass and are closely spaced relative to one another.

15. The apparatus of claim 14, wherein the vanes are inclined to the vertical.

16. The apparatus of claim 15, wherein individual vanes have different degrees of inclination along their heights, respectively.

17. The apparatus of claim 14, wherein the vanes are part of a unitized assembly which is adapted to be raised or lowered in the vessel, said assembly including a central tube concentric with the axis of rotation of the fluidized mass.

18. The apparatus of claim 12, wherein means are provided for introducing at least one stream of wash fluid into the lower portion of the vessel.

19. The apparatus of claim 18, wherein the lower portion of the vessel is formed with diametrically opposite entryways, and the wash-fluid-introducing-means are nozzles directed into said entryways.

20. The apparatus of claim 19, wherein the impeller is mounted on an impeller shaft extending into the vessel from the top and terminating in the lower portion of the vessel, and wherein there are additionally provided means on said shaft for elevating and distributing portions of the fluidized mass.

21. The apparatus of claim 20, wherein the means for elevating and distributing portions of the fluidized mass includes a tubular lower portion for the shaft, having an open bottom and side openings near its top, and wherein the means for introducing at least one stream of wash fluid includes means for directing a stream of wash fluid toward the open bottom of said lower portion of the shaft.

22. The apparatus of claim 12, wherein the vessel comprises lower and upper sections of substantially conical and substantially cylindrical formations, respectively, and wherein the diameter of the conical lower section is greater than the diameter of the upper cylindrical section.

23. The apparatus of claim 12, wherein there are additionally provided magnetic means encircling the vessel, for segregating and agglomerating magnetic particles in the feed material.

24. The apparatus of claim 12, wherein the means for continuously introducing the discrete solid particles and the fluid medium comprise a feed well extending through the upper portion of the chamber and having a discharge near the top of the lower portion of the chamber.

References Cited

UNITED STATES PATENTS

| | | | |
|---|---|---|---|
| 492,720 | 2/1893 | Frey | 209—148 |
| 1,249,684 | 12/1917 | Spaulding | 209—169 |
| 1,260,135 | 3/1918 | Blomfield | 210—512 |
| 2,132,961 | 10/1938 | Morgan | 209—139 |
| 2,420,392 | 5/1947 | Christensen | 209—161 X |
| 2,426,839 | 9/1947 | Morris | 209—158 X |
| 2,711,248 | 6/1955 | Roe | 209—39 |
| 2,767,847 | 10/1956 | Russell | 210—84 X |
| 2,823,801 | 2/1958 | Strohl | 209—211 X |
| 2,829,771 | 4/1958 | Dahlstrom | 209—211 |
| 3,035,697 | 5/1962 | Koch | 209—161 |
| 3,071,447 | 1/1963 | Bernhardi | 209—159 X |

FOREIGN PATENTS 902,601  1/1954  Germany.

OTHER REFERENCES

Wet Cyclones, O. F. Tangel and R. J. Brison, Chemical Engineering, vol. 62, No. 6, June 1955 (pp. 234–238).

FRANK W. LUTTER, *Primary Examiner.*